Figure 1:
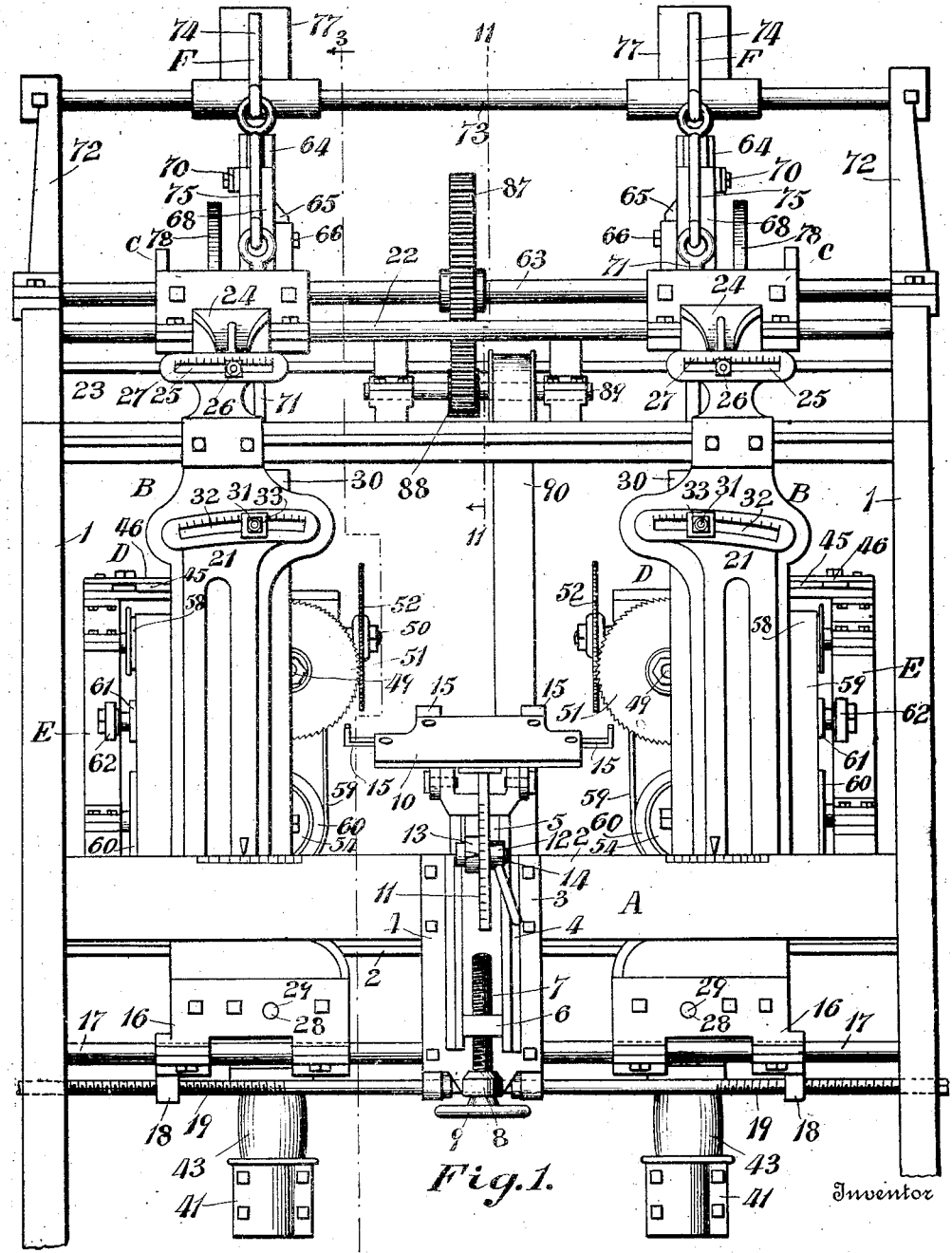

J. N. JENNES.
NOTCHING MACHINE.
APPLICATION FILED MAY 26, 1911.

1,043,705.

Patented Nov. 5, 1912.
8 SHEETS—SHEET 1.

Witnesses
Thos. F. Knox
Wm. Bagger

Inventor
Joseph N. Jennes
By Victor J. Evans
Attorney

J. N. JENNES.
NOTCHING MACHINE.
APPLICATION FILED MAY 26, 1911.

1,043,705.

Patented Nov. 5, 1912.
8 SHEETS—SHEET 3.

Witnesses
Thos. F. Knox,
Wm. Bagger

Inventor
Joseph N. Jennes
By Victor J. Evans
Attorney

J. N. JENNES.
NOTCHING MACHINE.
APPLICATION FILED MAY 26, 1911.
1,043,705.
Patented Nov. 5, 1912.
8 SHEETS—SHEET 4.
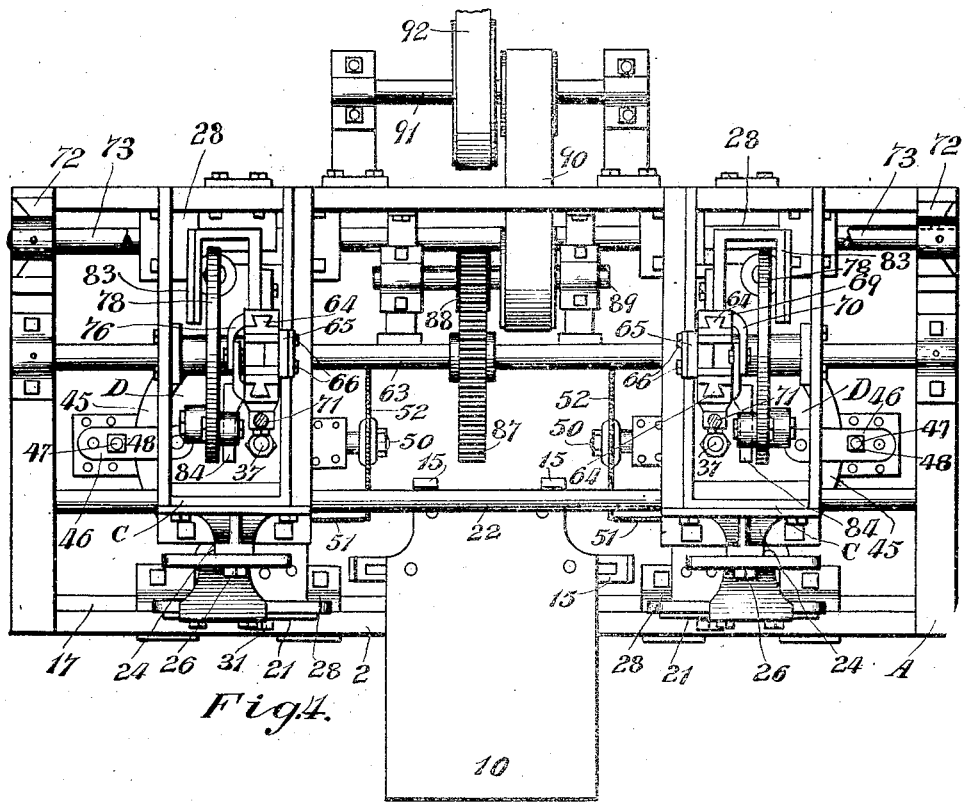
Fig.4.
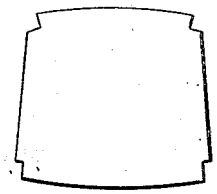
Fig.15.
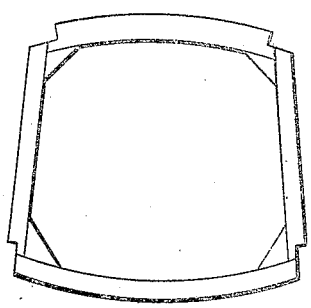
Fig.16.
Fig.17.
Witnesses
Thos. F. Knox,
Wm Bagger
Inventor
Joseph N. Jennes
By Victor J. Evans
Attorney

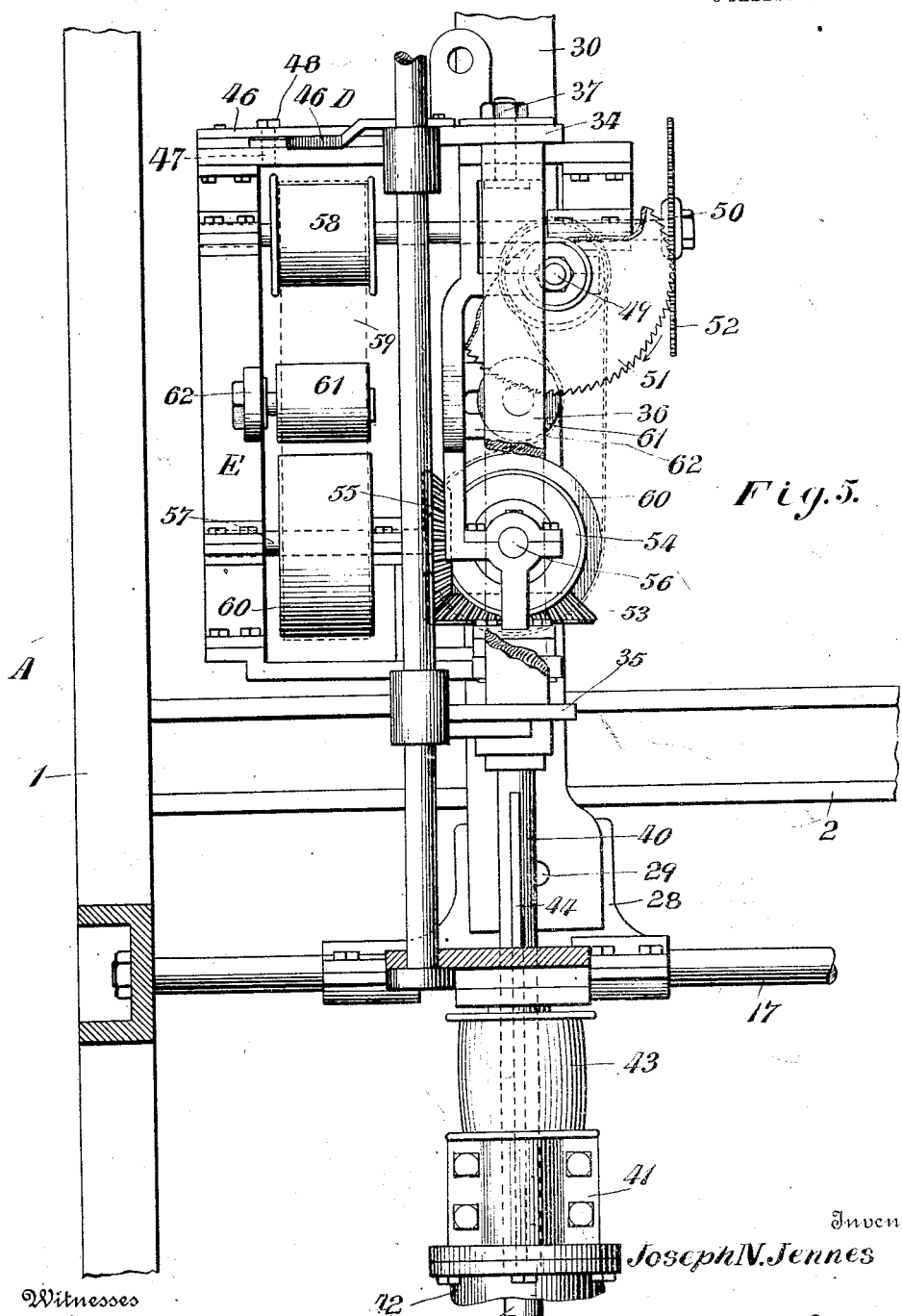

J. N. JENNES.
NOTCHING MACHINE.
APPLICATION FILED MAY 26, 1911.

1,043,705.

Patented Nov. 5, 1912
8 SHEETS—SHEET 6.

Witnesses
Thos. F. Knox,
Wm. Bagger

Inventor
Joseph N. Jennes
By Victor J. Evans
Attorney

J. N. JENNES.
NOTCHING MACHINE.
APPLICATION FILED MAY 26, 1911.

1,043,705.

Patented Nov. 5, 1912.
8 SHEETS—SHEET 7.

Witnesses
Thos. F. Knox,
Wm. Bagger

Inventor
Joseph N. Jennes
By Victor J. Evans
Attorney

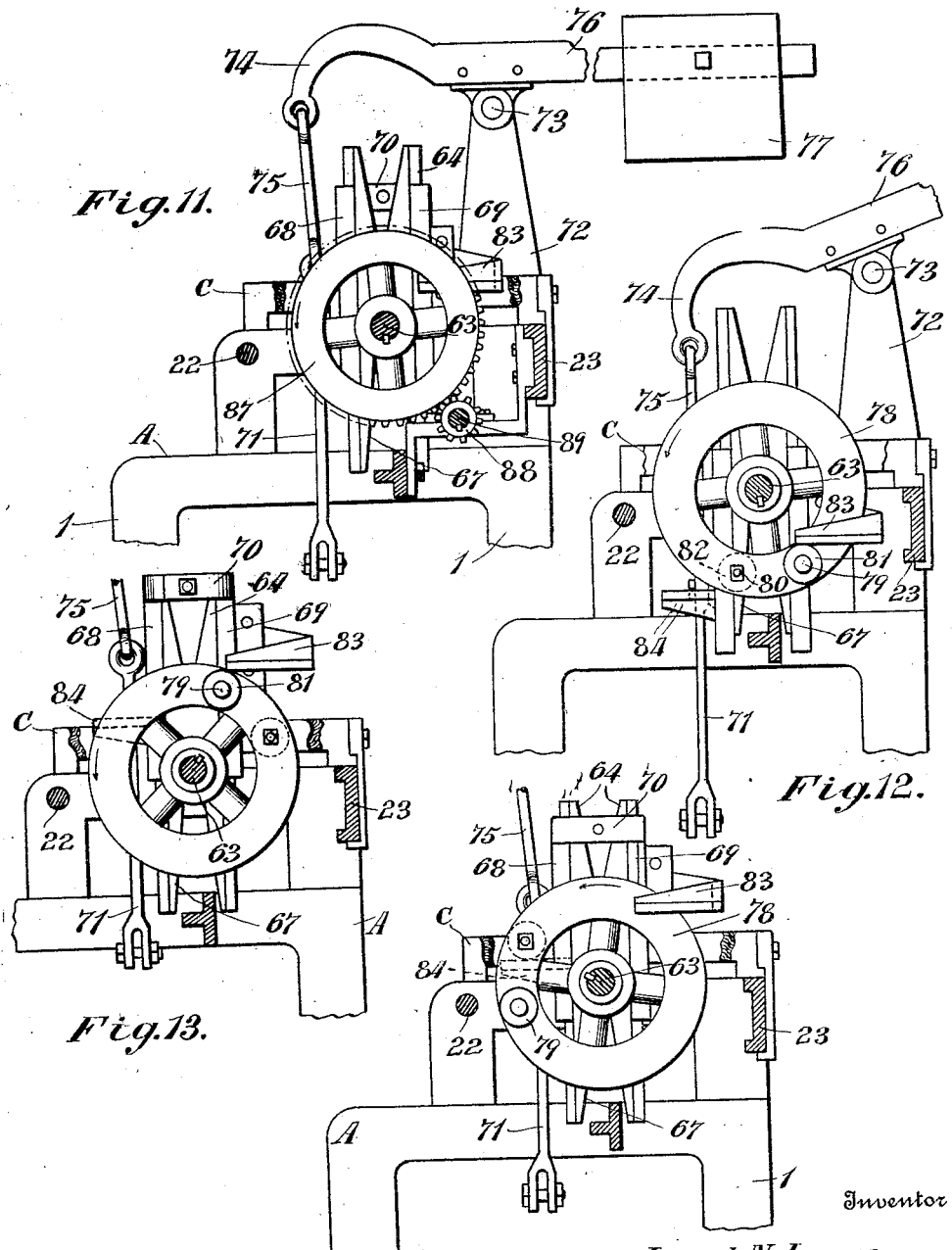

UNITED STATES PATENT OFFICE.

JOSEPH N. JENNES, OF SUPERIOR, WISCONSIN.

NOTCHING-MACHINE.

1,043,705.

Specification of Letters Patent.

Patented Nov. 5, 1912.

Application filed May 26, 1911. Serial No. 629,651.

*To all whom it may concern:*

Be it known that I, JOSEPH N. JENNES, a citizen of the United States, residing at Superior, in the county of Douglas and State of Wisconsin, have invented new and useful Improvements in Notching-Machines, of which the following is a specification.

This invention relates to notching machines, and it has particular reference to an improved machine for notching the corners of chair seats, box seats and the like by the action of circular saws movably disposed in angular relation. One object of the present invention is to provide an organized machine of simple and improved construction, comprising two saw carrying units adapted to be simultaneously operated and whereby two corresponding corners of a seat may be simultaneously notched.

A further object of the invention is to provide a construction whereby the saw guides may be tilted, thus enabling the notches to be formed obliquely when desired.

A further object of the invention is to provide a construction whereby the angularly disposed saws may be adjusted about an approximately vertical axis, at right angles to the saw carrying units, thus enabling the notches to be formed at various angles with reference to the material that is being operated upon.

Still further objects of the invention are to simplify and improve the general construction and operation of a machine of the character described.

With these and other ends in view which will readily appear as the nature of the invention is better understood, the same consists in the improved construction and novel arrangement and combination of parts which will hereinafter be fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 2:
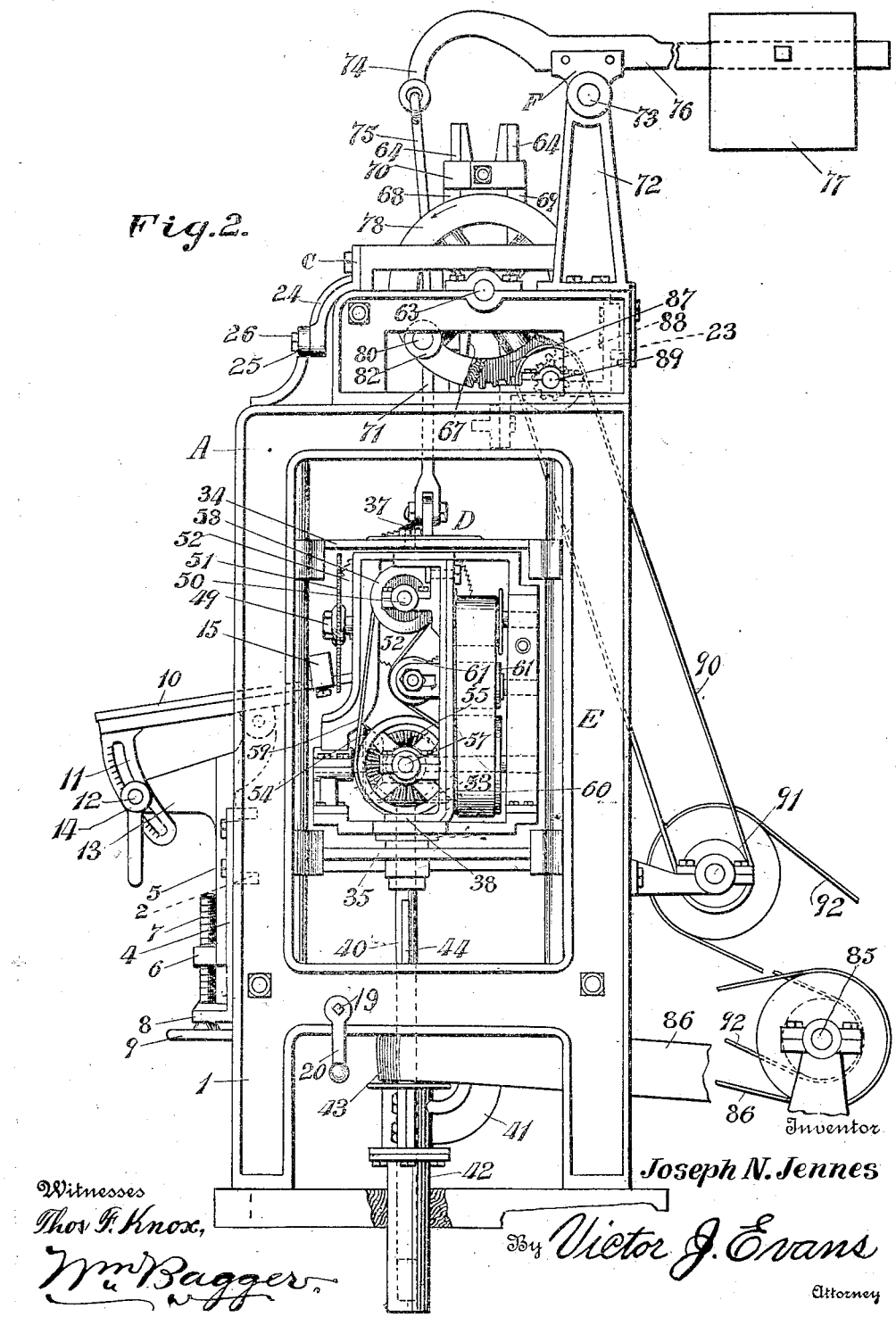
Figure 3:
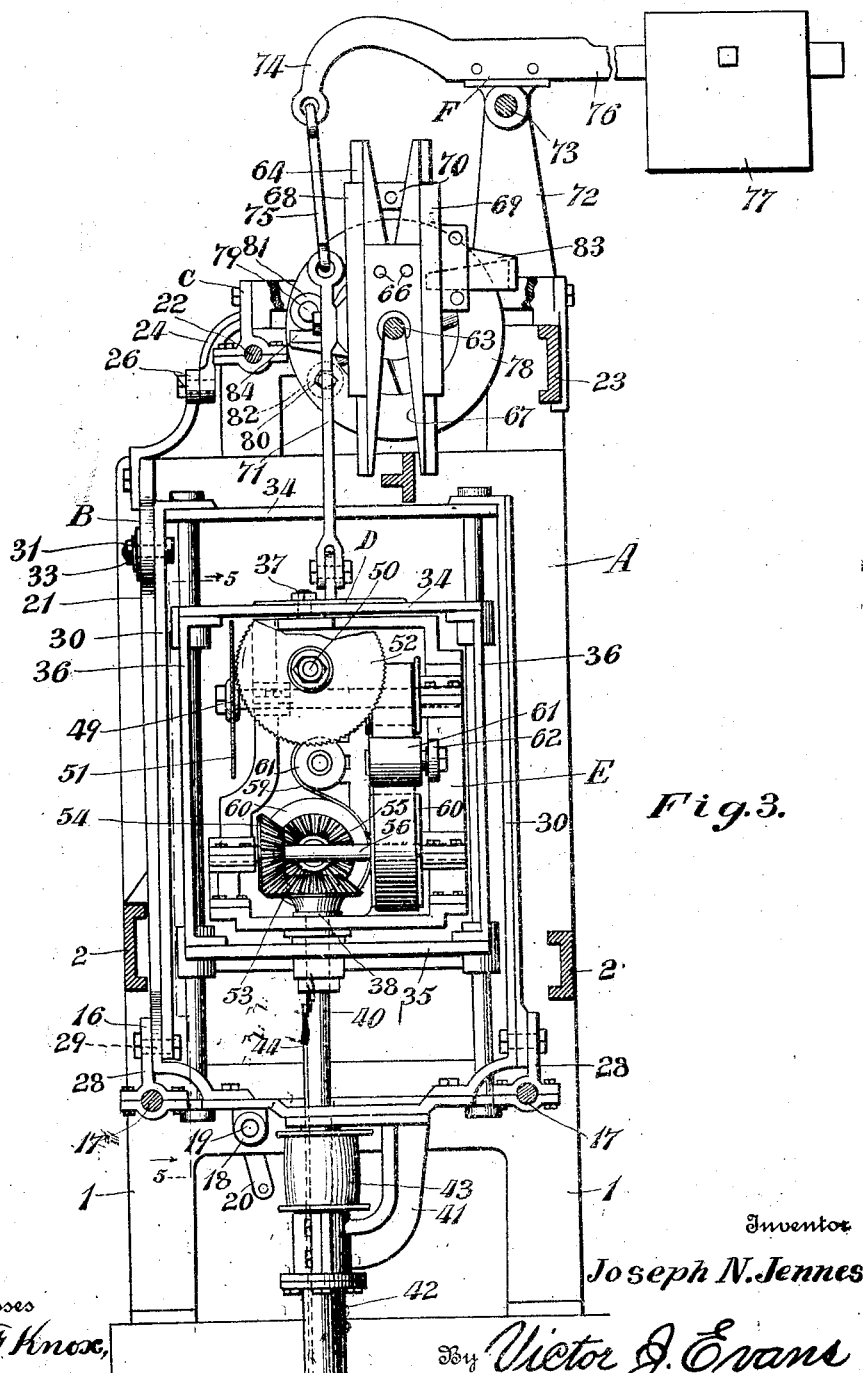
Figure 6:
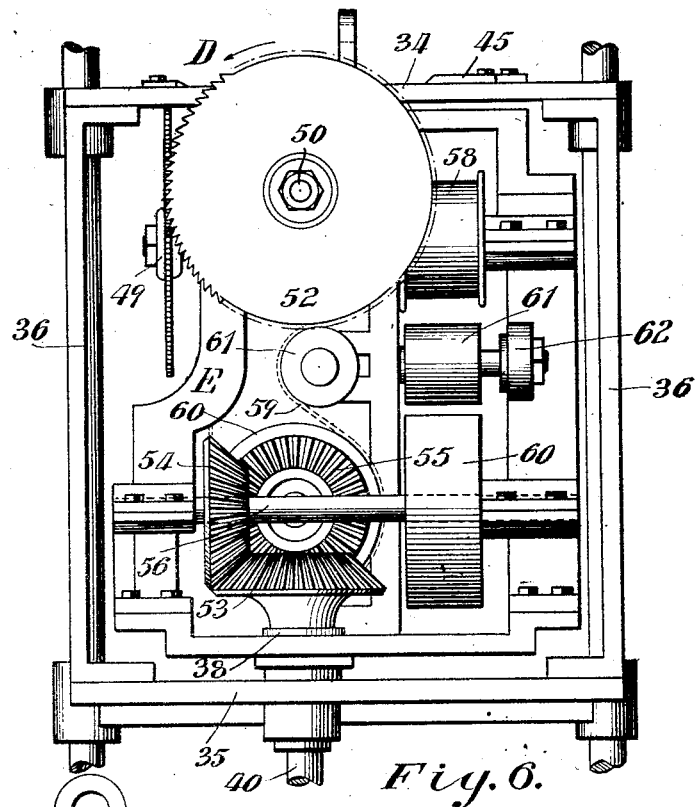
Figure 7:
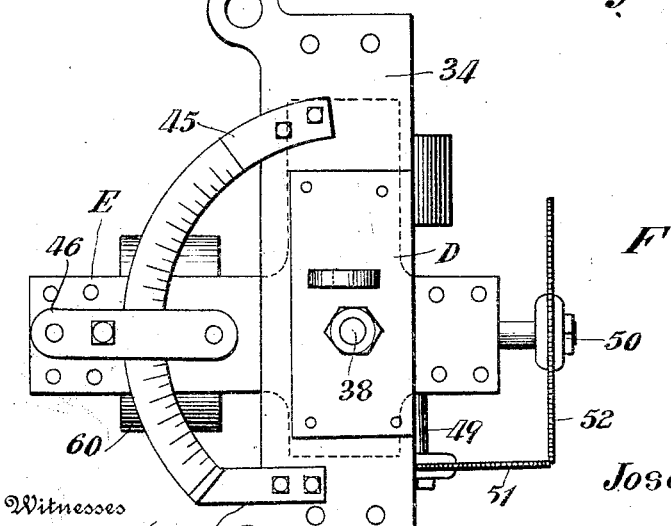
Figure 8:
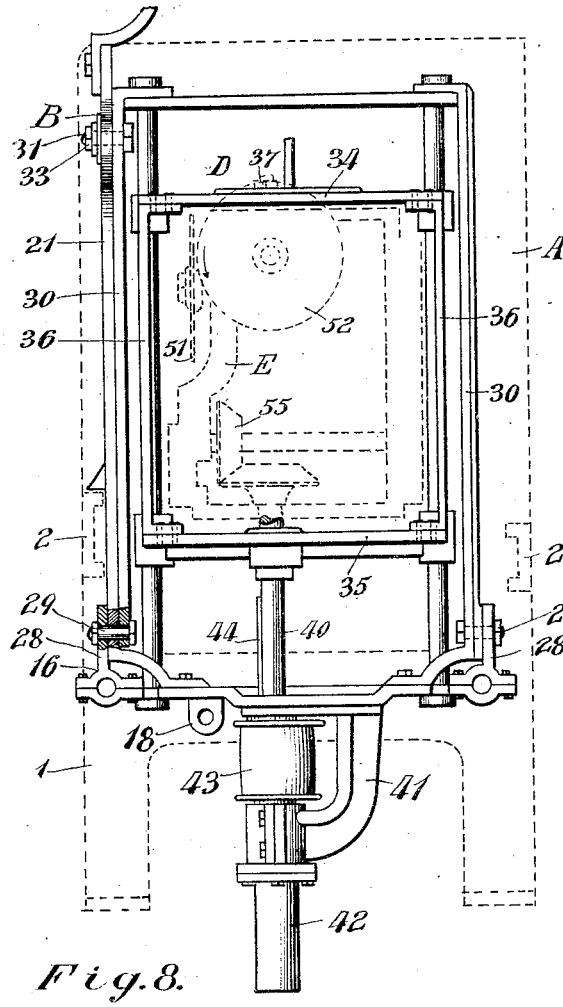
Figure 9:
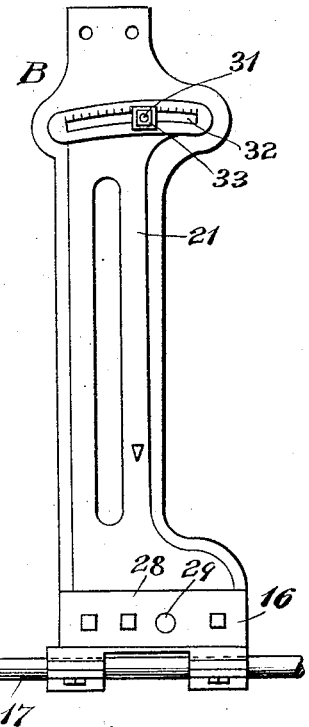
Figure 10:
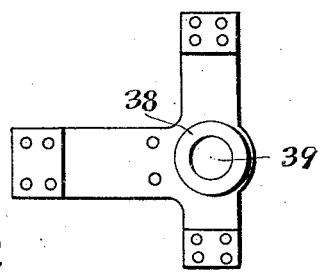

In the drawings,—Figure 1 is a view in front elevation of a machine embodying the invention. Fig. 2 is a side elevation of the same, some parts being shown in section. Fig. 3 is a vertical sectional view taken on the line 3—3 in Fig. 1. Fig. 4 is a top plan view with the counterbalancing means removed. Fig. 5 is a sectional elevation, enlarged, taken substantially on the line 5—5 in Fig. 3, to show the saw carrying turret frame, the saw carriage, the carriage guide and related parts. Fig. 6 is a sectional elevation taken substantially at right angles to Fig. 5. Fig. 7 is a top plan view of a saw carriage and related parts which are shown substantially in Figs. 5 and 6. Fig. 8 is an elevation of the saw carriage and the carriage guide. Fig. 9 is a front view of a portion of the frame of one of the saw carrying units. Fig. 10 is a bottom view of one of the turret frames. Fig. 11 is a sectional detail view taken on the line 11—11 in Fig. 1. Figs. 12, 13 and 14 are detail sectional elevations showing various positions of the automatic actuating means for the saw carriages. Figs. 15, 16 and 17 are detail plan views showing specimens of material that has been notched by the improved machine illustrating how notches may be formed differently by said machine.

Corresponding parts in the several figures are denoted by like characters of reference.

The frame A of the improved machine is constructed mainly of cast iron, the component parts being suitably bolted or otherwise connected together. The frame includes side members 1, 1 and a front bar 2, the latter supporting a bracket 3 having guides 4, 4 between which a slide 5 is vertically adjustable, said slide being provided with a nut 6 engaged by a screw 7 which is swiveled in a flange 8 at the lower end of the bracket 3, said screw being provided with a hand wheel 9, whereby it may be manipulated for the purpose of effecting vertical adjustment of the slide 5. Hingedly connected with the slide 5 adjacent to the upper end thereof is a work supporting table 10 having an arcuate slotted arm 11 engaging a bolt 12 which is associated with a flange 13 projecting forwardly from the slide, said bolt being provided with a clamp nut 14 by tightening which the work supporting table may be secured in any position to which it may be tilted or adjusted. The work supporting table is provided with work engaging gage members 15 to facilitate the proper adjustment of the material to be operated upon.

The machine includes two saw carrying units B, B which are supported in rear of the work supporting table, one adjacent to each side of the latter. Except that they are made in right and left patterns the units B, B are of similar construction, each including a base 16 which is supported on two guides 17 of round steel, said guides being supported transversely in the frame. Each base 16 is also provided with a downwardly extending flange 18 which is apertured and threaded to form a nut, said nuts engaging right and left threads upon a screw threaded rod 19 which is supported for rotation in the frame and which is provided with a handle 20 whereby it may be rotated in order to effect the desired adjustment of the units B, B toward or away from each other from the center of the frame, as may be required. Each of the units also includes an upright front stay 21 rising from the base, the upper ends of said front stays being adjustably connected with carriages C which are supported for movement transversely of the frame upon suitable guide rails or supporting members, one of which has been shown as consisting of a rod 22, while another consists of a rail 23. The carriages C which may be regarded as constituting the top members of the saw carrying units are provided with downwardly and forwardly extending brackets 24 having transverse slots 25 for the passage of bolts 26 whereby said carriages are adjustably connected with the upper ends of the front stays 21. Adjacent to the upper edges of the slots 25 measuring scales are marked off, as shown at 27, in order that the correct and desirable adjustment may be readily and quickly effected at any time.

Each of the base members 16 is provided with front and rear bearings 28 for anchor pivots 29 serving to support the saw carriage guide 30 in position to enable said guide to be tilted to the desired extent, the tilting movement being limited by means of a bolt member 31 extending from the saw guide near the upper end thereof and engaging an arcuate slot 32 in the upper end of the front stay 21, said bolt member being provided with a clamp nut 33. The slot 32 is obviously concentric with the anchor pivots, and said slot should be of such dimensions as to permit an adjustment of ten to fifteen degrees, the degrees being marked adjacent to the slot, as shown. The saw carriage guide 30 consists of a suitably constructed frame including a plurality of guide rails or members which are normally disposed in an upright position, but which may be tilted about the axis of the anchor pivots 29 to a limited extent, as previously described. The saw carriage D is guided for reciprocatory movement upon the saw carriage guide 30, and said saw carriage consists of a suitably constructed substantially rectangular frame including top and bottom members 34, 35 and side members 36, said frame being suitably mounted for reciprocatory movement upon the upright members of the guide.

The saws which constitute the notch cutting members are mounted for operation in a frame or turret E, which latter is pivotally supported in the frame or carriage D, said turret being provided at its upper and lower ends with pivot members 37, 38 that are journaled, respectively, in the top and bottom members 34, 35 of the carriage. The pivot member 37 is a pintle or journal of ordinary construction, but the pivot member 38 consists of an annular collar surrounding an aperture for the passage of a shaft 40. Said shaft extends through the bottom of the saw carriage guide, which latter is provided with a downwardly extending bracket 41 carrying the oil tube or well 42 into which the shaft 40 extends, said shaft passing through a pulley 43 which is supported upon the bracket 41 beneath the bottom of the guide 30. It is understood that the shaft 40 is provided with a spline 44 whereby it is associated for rotation with the pulley 43, while it is free to move longitudinally of the latter.

The top of the saw carriage D is provided with an arcuate bar 45 which is concentric with the axis of the pivot 37, said arcuate bar being engaged by a clamp or clasp 46 which is associated with the top of the saw turret and is adapted to be secured by means of a bolt 47 and nut 48, thereby retaining the saw turret in any position to which it may be adjusted with reference to the saw carriage. The arcuate bar 45 may be marked to indicate the degrees of a circle, thus enabling the proper adjustment to be readily effected.

The turret E is provided with bearings for the saw carrying shafts or arbors 49, 50 which are disposed at right angles to each other, the shaft 50 being disposed slightly above the shaft 49. The shafts or arbors carry the circular saws 51, 52 which are obviously disposed at right angles so that by the combined action of said saws a rectangular notch may be cut in material exposed to the action of the saws. Means may be provided for effecting longitudinal movement of the saw shafts or arbors in order to enable proper adjustment to be made to compensate for wear, said shafts being preferably anchored in such a manner as to positively prevent displacement after the proper desired adjustment has been effected.

The shaft 40, which extends through the base of the turret and through the base of the saw carriage guide, is provided with a bevel gear 53 meshing with bevel gears 54, 55 upon shafts 56, 5, which are disposed at right angles to each other below and in substantially parallel relation to the saw carrying shafts 49 and 50, the latter shafts being each provided with a pulley or band wheel 58 receiving motion through the medium of a belt or band 59 from the front pulleys 60 upon the shafts 56, 57. Belt tightening pulleys 61 for the purpose of keeping the belts 60 properly tensioned are carried by brackets 62 which are adjustably mounted upon the turret frame. It will be seen that by the construction described, motion will be transmitted from the shaft 40 through the bevel gearing 53, 54, 55 to the shafts 56, 57 and thence to the saw carrying shafts. By this construction the saw carrying shafts may be each provided with boxes or bearings adjacent to both ends thereof, thus affording the firm support which is needed to insure the best results. It is desired to be understood that instead of using means including belts for transmitting motion from the shafts 40 to the saw arbors, any suitable gearing or motions transmitting means may be employed, but as such a change would be within the scope of the skilled mechanic, it has not been deemed necessary to particularly illustrate the same.

Supported for rotation in suitable bearings adjacent to the top of the frame A and transversely of said frame is a shaft 63, said shaft being extended beneath the top carriage member C. Said carriages support upright guides 64 consisting of castings each having a lateral offset 65 resting upon the upper edge of the carriage C with which the guide is firmly connected by fastening members, such as bolts 66. The vertical guides which are thus associated with the carriages C are bifurcated, as shown at 67, to straddle the shaft 63, this construction being resorted to for convenience in assembling the parts. The guides 64 have been shown as being mounted upon the side walls of the carriages C which are nearest to the center of the machine and which for convenience may be termed the inner side walls. Each of the guides 64 carries two slides 68, 69 engaging, respectively, the front and rear sides of said guide, said slides being connected by means of a cross bar or yoke 70 so as to operate in unison. The front slide 68 is connected by a link 71 with the upper end of the saw carriage D at the corresponding side of the machine so that by the reciprocatory movement of the slides 68, 69 upon the guide 64 the saw carriage will be reciprocated.

The frame A is provided with upwardly extending brackets 72 affording bearings for a rod or shaft 73 carrying levers F, each of which has a forwardly extending arm 74 which is connected by a link 75 with one of the links 71 associated with the slides 68. The levers F are also provided with rearwardly extending arms 76 carrying adjustable counter weights 77, whereby the weight of the slides 68, 69 and of the saw carriages and related parts is counterbalanced. The levers F are slidable or adjustable upon the shaft 73 so that when the units of the notching machine are adjusted laterally, the said levers may be adjusted therewith in order to preserve the proper relation between the different parts to insure the most effective operation.

The center shaft 63 is provided with wheels or disks 78 which are slidable upon said shaft, but associated therewith for rotation by means of splines or keys of ordinary construction. Said wheels or disks are located within the frames constituting the carriages C, and are movable with said carriages. Each of the wheels 78 carries at opposite sides thereof wrist pins or cranks 79, 80 preferably equipped with anti-friction rollers 81, 82, said anti-friction cranks being adapted to engage shoes 83, 84 with which the rear and front slides 69, 68 are, respectively, provided. The shoe 83 associated with the rear slide 69 is in the form of a U which straddles the wheel 78, the inner limb of said U being secured upon the slide 69, while the outer limb is disposed in the path of the roller upon the crank 79 which is mounted upon the outer side of the wheel or disk. The shoe 84 associated with the front slide 68 is disposed in the path of the roller upon the crank 80 of the wheel. It will, moreover, be noticed that the shoe 83, the underside of which is engaged by the crank 79 to produce an upward movement of the slides 69, 68 when the wheel 78 is rotated in the proper direction, as indicated by an arrow, is located above the front shoe 84. It will, furthermore, be noticed that the crank 79 is located some distance in advance of the crank 80 upon the opposite side of the wheel or disk 78. It follows from this construction that when the wheel 78 is rotated, assuming the parts to be in the relative position illustrated in Fig. 12 where the crank 79 is just passing into engagement with the shoe 83, while the crank 80 is just passing out of engagement with the shoe 84, the slides will be moved upwardly until the position shown in Fig. 13 is reached where the crank 79 is shown as just passing out of engagement with the shoe 83. The crank 80, however, is some distance behind the crank 79, while the shoe 84 is some distance in front of the shoe 83. A pause will thus occur in the movement of the slides upon the guide 64 until the crank 80 reaches the point at which it will engage the shoe 84, said pause involving the passage of the crank 80 through approximately 90 degrees or one-quarter of the revolution of the wheel 78. Assuming the wheel 78 to be timed to make from five to ten revolutions to the minute, it follows that a pause varying in duration from three seconds to 1½ seconds will occur, while the slides 68, 69 with related parts including the saw carriages, are at the extreme upper limit of their movement. When the position illustrated in Fig. 12 has been reached the slides 68, 69 will begin to descend under the impulse of the crank 80 engaging the shoe 84, and the downward movement will continue until the position shown in Fig. 12 has been resumed. At this point the crank 79 engages the underside of the shoe 83, and the upgoing movement of the slides 68, 69 and related parts will commence at the instant that the crank 80 passes out of engagement with the shoe 84, leaving no appreciable pause at the downward limit of the movement of the slides and related parts and dispensing positively with a dead center at either end of the movement.

Motion is transmitted from a main driven shaft 85 by means of belts or bands 86 to the pulleys 43 upon the shafts 40 from which motion is transmitted in the manner described to the saw carrying shafts or arbors. The shaft 63 carries a gear wheel 87 meshing with a pinion 88 upon a counter shaft 89 which receives motion by a belt 90 from a transmission shaft 91 which is driven by means of a belt 92 from the shaft 85.

From the foregoing description, taken in connection with the drawings hereto annexed, the operation and advantages of this invention will be readily understood by those skilled in the art to which it appertains. The material that is to be notched, which may be a wooden chair seat, a box seat, a chair arm or other article, is placed upon the table 10 which has been previously adjusted at the requisite angle. The units B of the machine are adjusted by means of the screw threaded rod 19 to place said units in such position that the pairs of saws will be stationed at the requisite distance apart. The saw carriage guides may now be tilted so as to present the planes of the saw at the desired angle with reference to the work, and the turrets may, likewise, be adjusted to present the pairs of saws at the proper angle. Adjustment is likewise made of the top members or carriages C with reference to the bottom members B of the saw carrying units, by means of the connecting bolts 26, for the purpose of lining up the top members or carriages C to the most favorable position with reference to the up and down movement of the saw carriages when the saw carriage guides have been tilted, so as to avoid a side pull on the saw carriage guides. All of said adjustments will obviously be determined by the character of the work to be performed, it being obvious that notches may be formed vertically or at various inclinations determined by the tilt of the supporting table and the tilt of the saw carriage guides and, likewise, that the side walls of the notches may be formed in parallel relation to the front and sides of the machine or at various inclinations thereto by proper adjustment of the turrets. It is also evident that by proper adjustment of the units the machine may be adapted to operate upon material of different widths to form notches at the corners of such material. Examples of the work have been shown in Figs. 15 to 18, but it is obvious that the machine is capable of performing a great range or variety of work.

After the proper adjustment of the machine has been effected for the work in hand and the machine has been started in operation, the work will be placed upon the supporting table which, as stated, is provided with gages whereby the work may be quickly and accurately placed in the proper position. By the action of the crank disks or wheels 78 on the shaft 63 the saw carriages will be reciprocated upon their respective guides, a pause occurring at the end of each up-stroke or upward movement of sufficient duration to enable the material which has been operated upon to be removed and another piece of material to be substituted upon the work supporting table, the duration of the pause being determined by the speed at which the machine is operated, and said pause being approximately one-fourth of the time required for a single complete operation. This action, it will be seen, is entirely automatic and does not in any degree depend upon the operator whose attention will not be distracted but may be devoted entirely to the work in hand. It follows that much greater speed may be attained than in machines where the tool carrying members are operated by mechanism which requires to be controlled by the operator, and the out-put may thus be materially increased without a corresponding increase in the working expenses.

Having thus described the invention, what is claimed as new, is:—

1. A tool carrying unit including slidably supported base and top members and a front stay connecting said base and top members, guides supporting said base and top members for lateral movement, means whereby the top member of each unit is adjustably connected with the front stay, a carriage guide tiltably connected with the base of the unit, means for securing said carriage guide at various adjustments, a saw carriage movable upon the guide, and means for imparting a reciprocatory movement to the saw carriage.

2. A tool carrying unit comprising slidably supported base and top members and a front stay connecting said base and top members, a carriage guide pivotally connected with the base member and adjustably connected with the front stay, a saw carriage mounted upon the guide, means for reciprocating the saw carriage, a turret frame pivotally supported in the carriage, a pair of saw carrying arbors mounted in the turret frame approximately at right angles to each other, and means for transmitting motion from a source of power to the saw carrying arbors.

3. A tool carrying unit comprising slidably supported base and top members and a front stay connecting said base and top members, a carriage guide pivotally associated with the base member, means for securing the carriage guide at various adjustments, a bracket depending from the carriage guide and having a downwardly extending tubular well, a saw carriage mounted upon the guide, a turret frame associated with the saw carriage by means of upper and lower pivotal members, the lower pivotal member being in the form of a sleeve, a shaft extending through said sleeve into the tubular well, saw carrying arbors supported for rotation in the turret frame at approximately right angles to each other, means for transmitting motion to said saw carrying arbors from the shaft that extends into the tubular well, means for driving said shaft, and means for imparting a reciprocatory motion to the saw carriage.

4. A carriage guide, a saw carriage mounted thereon for reciprocation, a turret frame pivotally associated with the saw carriage for oscillation about the axis which is in approximately parallel relation to the carriage guide, saw carrying arbors supported for rotation in the turret frame approximately at right angles to each other, means for securing the turret frame at various adjustments, means for driving the saw carrying arbors, and means for reciprocating the saw carriage.

5. A carriage guide, a saw carriage mounted thereon for reciprocation and having an arcuate bar associated therewith, a turret frame pivotally associated with the saw carriage and having a clasp engaging the arcuate bar to secure the turret frame at various adjustments, saw carrying arbors supported for rotation in the turret frame approximately at right angles to each other, means for reciprocating the saw carriage, and means for transmitting motion from a source of power to the saw carrying arbors.

6. A frame, a tool carrying unit slidably supported upon the frame and including base and top members and a front stay connecting said base and top members, a saw guide pivotally connected with the base member and adjustably connected with the front stay, a saw carriage mounted upon the guide for reciprocation, a guide associated with the top member of the unit, a slide movable upon said guide, a link connecting said slide with the saw carriage, a slidably supported lever having one arm provided with a counterweight, and means connecting the other arm of the lever with the slide.

7. A frame, a tilting work supporting table associated therewith, means for retaining the tilting table at various adjustments, tool carrying units slidably supported upon the frame at either side of the work supporting table, and means for adjusting said units toward and away from each other; each unit including a pivotally supported carriage guide, a saw carriage supported thereon for reciprocation, a turret frame pivotally and adjustably associated with the saw carriage, and saw carrying arbors supported for rotation in the turret frame approximately at right angles to each other, means for reciprocating the saw carriages, and means for driving the saw arbors in the turret frames.

8. A frame, a tilting work supporting table associated therewith, means for retaining the tilting table at various adjustments, tool carrying units slidably supported upon the frame at either side of the work supporting table, and means for adjusting said units toward and away from each other; each unit including a pivotally supported carriage guide, a saw carriage supported thereon for reciprocation, a turret frame pivotally and adjustably associated with the saw carriage, and saw carrying arbors supported for rotation in the turret frame approximately at right angles to each other; means for automatically actuating the saw carriages by reciprocating the latter intermittently with a pause at the termination of each up-stroke, and means for constantly driving the saw carrying arbors.

9. A frame, a slidably supported tool carrying unit including base and top members and a front stay connecting said base and top members, an upright guide associated with the top member, a carriage guide pivotally associated with the base member, means for securing said carriage guide at various adjustments, a saw carriage slidable on the guide, a slide upon the upright guide associated with the top member, a link connecting said slide with the saw carriage, movably supported means for counterbalancing the weight of the slide and the saw carriage, and means for imparting to the slide an intermittent reciprocatory motion with a pause at the limit of the up-stroke.

10. A tool carrying unit including a rocking guide, means for securing said guide at various adjustments, a saw carriage mounted upon the guide for reciprocation, a turret frame associated with the saw carriage by means of pivots one of which is tubular, a shaft extending through the tubular pivot, means for intermittently reciprocating the saw carriage, means for constantly driving the shaft that extends through the tubular pivot, saw carrying arbors supported for rotation in the turret frame approximately at right angles to each other, and means for transmitting motion to said saw carrying arbors from the driven shaft that extends through the tubular pivot.

11. A tool carrying unit including a saw carriage supported for reciprocation and an upright guide, slides upon said guide, said slides being connected together to move in unison a link connecting one of the slides with the saw carriage, means for counterbalancing the weight of the slides and the saw carriage, a wheel supported for rotation adjacent to the guide and having crank members on opposite sides thereof, one in advance of the other, and shoes associated with the slides and lying in the path of the crank members on opposite sides of the wheel.

12. A tool carrying unit comprising a saw carriage supported for reciprocation, an upright guide, slides upon said guide, said slides being connected together to move in unison a wheel supported for rotation adjacent to the guide and having crank members on opposite sides thereof, one in advance of the other, shoes associated with the slides and disposed one above the other, one of said shoes being U-shaped to straddle the wheel and said shoes being disposed in the paths of the respective crank members on opposite sides of the wheel, the parts being relatively so disposed that one crank member will engage the underside of the U-shaped shoe to start the upgoing movement of the slides at the moment when the other crank member leaves the surface of the other shoe, while said last mentioned crank member will not engage the said last mentioned shoe to produce a down-going movement of the slides until the lapse of a considerable pause after the completion of the up-going movement induced by the contact of the first-mentioned crank member with the underside of the U-shaped shoe.

13. A slidably supported tool carrying unit comprising base and top members and a front stay extending from the base member and adjustably connected with the top member, a carriage guide pivotally connected with the base member and adjustably connected with the front stay, a saw carriage mounted for reciprocation upon the carriage guide, means associated with the top member of the unit for imparting to the saw carriage an intermittent reciprocatory motion, saws mounted in the carriage, and means for constantly driving said saws.

14. A frame, a tool carrying unit slidably supported upon the frame and including base and top members, said base having a front stay adjustably connected with the top member, a carriage guide pivotally associated with the base, means for retaining the carriage guide at various adjustments, a saw carriage supported for reciprocation upon the guide, saws adjustably supported in the carriage, means for retaining the saws at various adjustments, means for constantly driving the saws, means associated with the top member of the unit for intermittently reciprocating the saw carriage, and means for counterbalancing the weight of the saw carriage and the movable parts associated therewith.

15. A frame, a vertically adjustable and tiltably supported work supporting table associated therewith, a pair of units slidably supported upon the frame, one at either side of the work supporting table, and means for adjusting said units toward and away from each other; each unit comprising a base member having an upwardly extending front stay and a top member adjustably connected with said front stay, a carriage guide pivotally associated with the base member, means for retaining said carriage guide at various adjustments, a saw carriage mounted for reciprocation upon the carriage guide, a turret frame pivotally associated with the saw carriage, means for securing the turret frame at various adjustments, saw carrying arbors supported for rotation in the turret frame approximately at right angles to each other, means for constantly driving the saw carrying arbors, means associated with the top member of each unit for imparting to the saw carriages an intermittent reciprocatory motion with a protracted pause at the termination of each up-stroke, and means for counterbalancing the weight of the saw carriages and associated parts.

In testimony whereof I affix my signature in presence of two witnesses.

JOSEPH N. JENNES.

Witnesses:
B. A. FUERST,
R. E. KENYON.